United States Patent [19]

Fedotowsky et al.

[11] 3,726,585
[45] Apr. 10, 1973

[54] ELECTRICALLY MODULATED RADIATION FILTERS

[76] Inventors: André Fedotowsky, 12 rue Francoeur, Cap Rouge, Quebec, Canada; Kurt Lehovec, 11 Woodlawn Drive, Williamstown, Mass. 01267

[22] Filed: Feb. 22, 1971

[21] Appl. No.: 117,489

[52] U.S. Cl..........350/160 R, 331/94.5 H, 332/7.51, 350/3.5, 350/166, 356/112
[51] Int. Cl................................................G02f 1/38
[58] Field of Search......................350/160, 166, 285; 332/7.51; 250/199; 356/112

[56] References Cited

UNITED STATES PATENTS

| | | | |
|---|---|---|---|
| 2,601,806 | 7/1952 | Turner | 350/166 |
| 2,692,952 | 10/1954 | Briggs | 350/160 |
| 3,066,576 | 12/1962 | Clorfeine | 350/285 |
| 3,156,825 | 11/1964 | Lines | 350/285 X |
| 3,158,746 | 11/1964 | Lehovec | 350/160 R |
| 3,198,070 | 8/1965 | Platzer, Jr. et al. | 350/285 X |
| 3,242,805 | 3/1966 | Harrick | 350/160 R |
| 3,307,897 | 3/1967 | Lohmann | 350/160 R |
| 3,360,324 | 12/1967 | Hora | 350/160 R |
| 3,379,486 | 4/1968 | Ujhelyi et al. | 350/160 R X |
| 3,387,909 | 6/1968 | Anderson et al. | 350/160 R X |
| 3,393,954 | 7/1968 | Enderby et al. | 350/160 R X |
| 3,432,222 | 3/1969 | Fleisher et al. | 350/160 R X |
| 3,476,460 | 11/1969 | Hansen et al. | 350/160 R |
| 3,485,552 | 12/1969 | Adler | 350/160 R |
| 3,498,693 | 3/1970 | Fein et al. | 350/160 R |
| 3,506,334 | 4/1970 | Korpel | 350/160 R |
| 3,515,458 | 6/1970 | Korpel et al. | 350/160 R |
| 3,516,727 | 6/1970 | Hickey et al. | 350/160 R |
| 3,517,983 | 6/1970 | Fein et al. | 350/160 R |
| 3,546,620 | 12/1970 | Erickson et al. | 350/160 R |
| 3,614,211 | 10/1971 | Letter | 350/285 |

FOREIGN PATENTS OR APPLICATIONS 342,219  1/1931  Great Britain....................350/166

OTHER PUBLICATIONS

Nethercot: "Light Modulator," IBM Tech. Disc. Bull. Vol. 6, pp. 55–56, Dec. 1963.
Nethercot: "Traveling Wave Light Beam Deflector," IBM Tech. Disc. Bull., Vol. 8, pp. 1257–1258, Feb. 1966

Primary Examiner—Ronald L. Wibert
Assistant Examiner—Edward S. Bauer

[57] ABSTRACT

The intensity of a monochromatic light beam is modulated by passing it through a multilayer arrangement near the critical angle of incidence thereby causing multiple reflections in one of these layers acting as an optical resonator and by varying the refractive index of at least one of said multilayers by an electrical or electromagnetic field.

11 Claims, 10 Drawing Figures

ELECTRICALLY MODULATED RADIATION FILTERS

BACKGROUND OF THE INVENTION

Electric modulators of radiation have been built by using one of the following principles: (i) Absorption of light modulated by the electric field, e.g., free carrier absorption [K. Lehovec, Radio Engrs., 40, 1407 (1952)]or else by the so-called Franz-Keldysh effect, and (ii) by using electrically induced double refraction, thereby changing the state of polarization of the radiation. E. O. Ammarson and J. M. Yarborough state in the Journal of Quantum Electronics, Vol. QE-4, No. 4, p. 209, April 1968, with respect to amplitude modulators of light using an electro-optic medium, "It is perhaps surprising that all of these devices produce amplitude modulation in essentially the same fashion as the simplified modulator of FIG. 1" and "The modulator of FIG. 1 consists of an imprint polarizer, an electro-optic medium, a quarter-wave plate and an output polarizer."

Amplitude modulators by absorption suffer from lack of sensitivity due to comparatively small change of absorption by electric fields in thin layers. If thick layers are used, there is usually a substantial absorption in absence of the electric field.

Polarization modulators are fairly complex structures requiring several elements including polarizer and analyzer means. Furthermore, usually substantial thickness of the electro-optic materials is required to provide the desired sensitivity.

These shortcomings are overcome by this invention which provides a modulator of high sensitivity and compact design, which does not need accessories such as polarizer and analyzer means.

BRIEF SUMMARY OF THE INVENTION

Briefly, the invention comprises a multiplicity of dielectric layers with the light beam to be modulated incident onto the interface between two of said layers at or near a critical angle at which the resonant condition for a multiple reflection wave pattern in one of these layers is achieved. The higher the reflectivity at the boundaries of this resonator layer, the more sharply defined is the resonant condition. In our invention provisions are made for generating an electric field in at least one of said layers thereby modifying its index of refraction. As a consequence of said modification, the intensities of reflected and of transmitted light beams emerging from this resonator are modulated in response to the electric signal applied.

Since changes of the refractive index by an applied field are rather small, it is important for our devices to have a sharply tuned resonance condition, which is achieved by using high reflectivity at the boundaries of the resonator. High reflectivity can be achieved by operating at or near angle of incidence where total reflection occurs.

The electric signal can be an electric field generated by potentials applied to electrodes or else the field in an electromagnetic wave such as a laser radiation mode in the dielectric layers where the multiple reflection wave pattern exists.

In the case of the field applied by electrodes, a rather high field is generated by a rather low voltage by applying the voltage across the narrow width of the dielectric layer or layers on whose boundaries the beam undergoes multiple reflections.

The light beam can be coupled into the filter structure either by refractive optics, or when a compact structure is desired, by a diffractive optical element such as a grating.

A multiplicity of electrically tunable optical filters according to this invention can be arranged into an array so that incident radiation is electrically modulated for a display pattern.

The local electric field can be generated from a d. c. power supply over a circuit containing a photosensitive layer whose resistance depends on illumination so that the field can be modified locally by illumination. In this manner, a light pattern can be translated into a pattern of local modulation of filter transmittance generating a holographic display of the beam passed through the filter.

Therefore, it is an object of this invention to disclose a compact selective optical filter whose transmittance can be tuned electrically by comparatively low voltages.

It is another object to describe an optical filter whose transmittance can be modulated by a laser mode in the filter structure.

It is still another object of this invention to use a filter array with locally variable selective means for display purposes.

It is yet another object to modulate the locally variable selective means by a pattern of light projected on that filter thereby generating a holographic display of the beam transmitted through the filter in response to said pattern of light.

These and other objects of this invention will be described in what follows.

DESCRIPTION OF PREFERRED EMBODIMENTS

The inventive structures utilize the laws of refraction and diffraction of radiation, and the modification of refractive index $n$ by an electric field $E$. In general $$1/n^2 = 1/n_o^2 + \alpha E + \beta E^2$$

where $n_o$ is the refractive index at zero applied field ($E = 0$), and $\alpha$, $\beta$ are coefficients known as Pockels and Kerr constants. These coefficients are generally quite small, so that only small variations in $n$ can be achieved even at rather large electric fields. However, the structures of the present invention are quite sensitive to small changes of $n$, for two reasons, which may occur singly or together:

i. The optical path length difference between the interfering beams is large in spite of rather small applied voltages, by passing the beam more or less along a thin dielectric layer undergoing a large number of multiple reflections, with voltage applied across the narrow dimension of said layer; highly reflecting, low absorption boundaries are utilized using such means as grazing angle reflections or tunneling layers.

ii. The coupling of radiation between two layers utilizes tunneling through a narrow layer of lower refractive index, which process is very sensitive to minute changes of refractive index in said narrow layer. In addition to the modulation of $n$ by $E$ expressed in previously given equation, there are other means, such as the removal of accumulation of free carriers by generating a space charge layer in a semiconductor which affect $n$. Free carriers, electrons or holes, contribute to the refractive index in a small but measurable way. Classical physics teaches that $n \approx n_o - Nq^2 \, 10^7 \lambda^2/[2n_o \epsilon_o m 4 \pi^2 c^2]$ where $N$ carrier concentration; $m$ carrier effective mass; $q$ electron charge; $\lambda$ wavelength; $c$ light velocity; $\epsilon_o = 8.86 \times 10^{-14}$ coul/volt cm (dimensions used are coul, cm, sec).

If one uses the space charge layer in a semiconductor as one of the dielectric films of the invention, the modification of the width of the space charge layer by the electric field contributes also to the electric tuning effect of an optical filter using said space charge layer as the optical resonator film.

Figure 1:
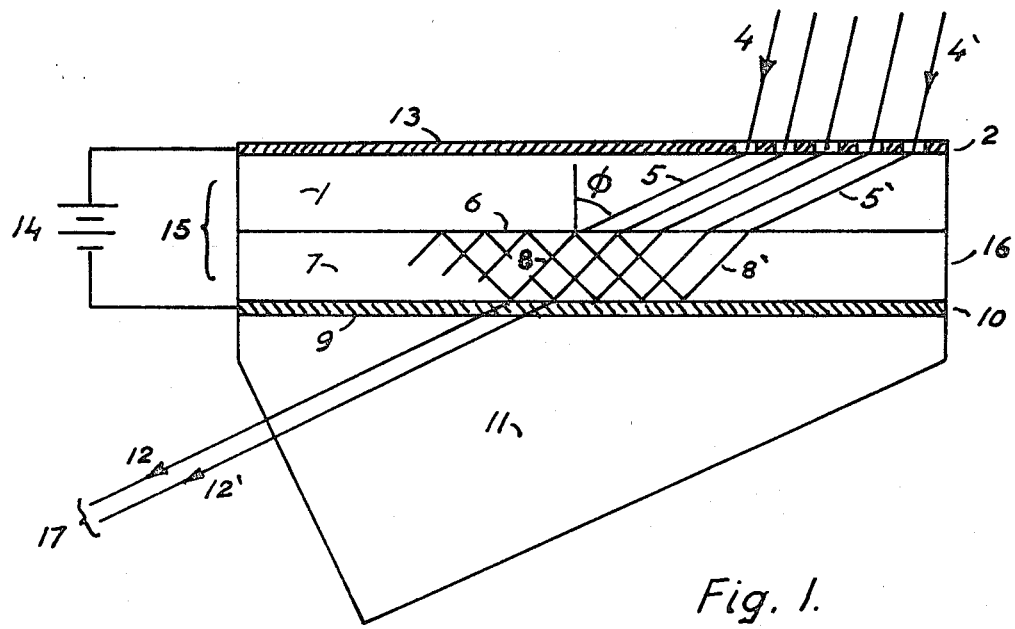
FIG. 1 shows an electrically tunable multiple reflection interference filter according to this invention.

Referring now to FIG. 1, there is shown an electrically tunable filter 15 according to this invention. Light beams 4, 4' are incident on transparent dielectric layer 1 having a diffractive grating 2 at its upper surface which diffracts light beam 4, 4' into beams 5, 5'. Beams 5, 5' are refracted at interface 6 between dielectric layers 1 and 7. Refracted beams 8, 8' undergo multiple reflections in 7. Portion of beams 8, 8' leave 7 through lower surface 9, which is coated with a thin transparent and conducting layer 10, e.g., a 200 A. gold film or a tin oxide layer several microns thick. Radiation then enters substrate 11 shaped to facilitate emission of outgoing beams 12, 12' in desired direction. Intensity of outgoing beam 17 depends on optical interference of beams such as 12 and 12'.

Outgoing beams 12 and 12' underwent different extents of multiple reflections in layer 7 and thus differ in phase in accordance with optical path length in 7 between two subsequent multiple reflections in relation to wavelength of 8, 8'. In general, lateral dimensions are much wider than shown in relation to film thickness, enabling high order multiple reflections of beams 8, 8' before leaving 7.

The intensity of transmitted beam 17 is usually quite small unless a certain relation is satisfied among wavelength, the refractive indices of layers 1, 7 and 11, the thickness of layer 7, the angle of incidence $\Phi$ of beam 5 on interface 6, and the phase shifts suffered by beam 8 upon reflection on the boundaries 6 and 9. This relation will be called resonance condition and is well-known for the design of interference filters. For a given structure, the angle of incidence $\Phi$ is chosen in our modulator to be at or very close to the angle of maximum transmission, i.e., to the angle at which the resonance condition is satisfied.

Application of an electric field between electrode 10 and the electrode 13 on top of 1, by means of battery 14, changes the refractive indices of 1 and 7 and thereby modifies the above-mentioned relation, thus affecting transmission. In case shown in FIG. 1, the refractive index of film 7 is larger than that of films 1 and 11.

In another preferred structure, refractive index of film 7 ($n_7$) is chosen smaller than that ($n_1$) of films 1 and 11, and beam 5 is made incident onto 6 at angle $\Phi$ just slightly smaller than critical angle $\Phi_c = \sin^{-1} n_7/n_1$, so that beams 8, 8' are incident on 6 and 9 under a very small grazing angle.

In this manner, very large optical path differences $l$ of 8 between two subsequent reflections on 6 can be produced, and even small changes of $n$ could lead to changes $l\Delta n + n\Delta l$ of optical path length $ln$ which are a substantial fraction of a wavelength thereby producing strong changes in the interference pattern of 12, 12', etc., generating the outgoing beam. The change $\Delta l$ arises from change in direction of beam 8 due to change of refraction angle with $\Delta n$.

While diffractive coupling for incoming beam 4 and refractive coupling for outgoing beam 12 has been shown, it should be understood that either one, diffractive or refractive couplings, can be used at interfaces where incident and outgoing beam enters or leaves filter; also, coupling of beam 4 into 7 could be achieved through side face 16. Furthermore, electrode 13 can be shifted to interface 6, and made semitransparent-like electrode 10, thereby applying the electric field only across layer 7.

There is a wide variety of electrode arrangements which can be used for the tunable filters of our invention. Electrodes include: thin transparent metal films located at interface, or else semiconducting transparent layers used as some of the dielectric layers of our filters. Useful semiconductor electrodes are $SnO_2$, silicon, GaAs, etc. Thick semiconducting layers are preferred over transparent metal layers, where high frequency modulation is desired, necessitating a low resistance path to the dielectric layers which act as a capacitor.

Figure 2:
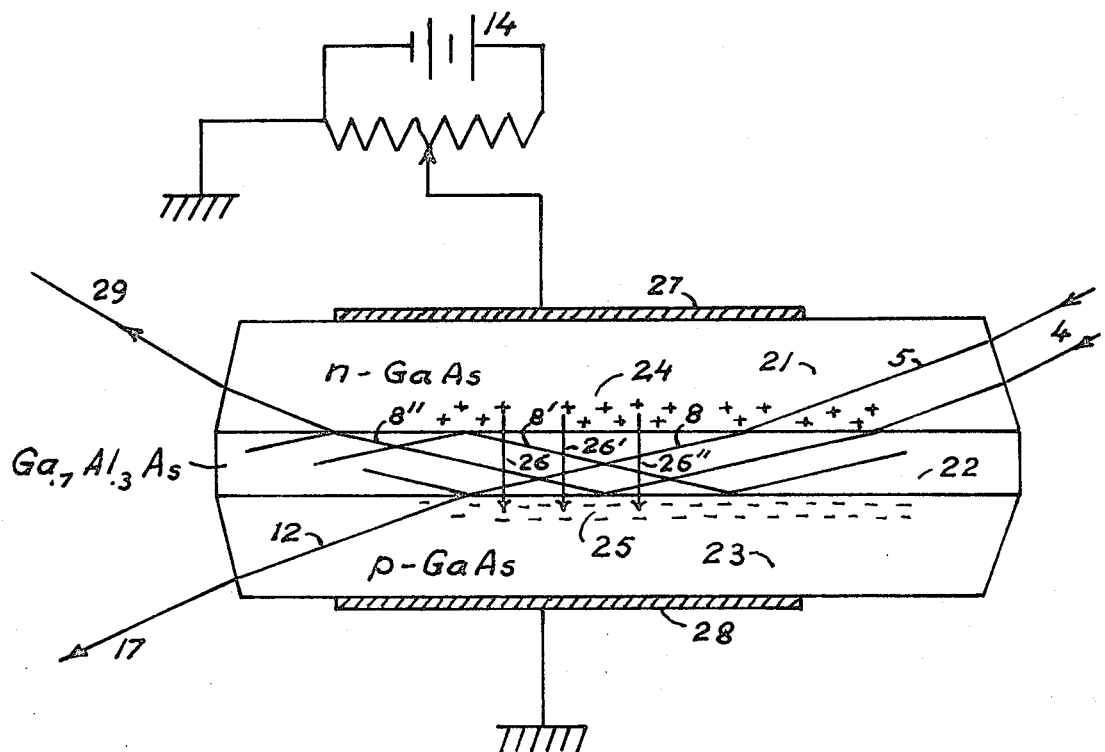
FIG. 2 shows another electrically tunable multiple reflection interference filter according to this invention.

FIG. 2 illustrates a tunable filter of type of FIG. 1; however, using semiconducting layers as electrodes and as dielectric layers.

Referring now to FIG. 2, there are shown in cross section three optical films 21, 22, 23 through which incoming light beam 4 passes before emission as beam 17. Layers 21 and 23 are n- and p-GaAs, and layer 22 is lightly doped (quasi-intrinsic)$GA_{0.7}Al_{0.3}As$ of approximately 2 microns thickness. The refractive indices are 3.6 for 21 and 23 and 3.3 for 22.

Only one beam 4–5–8–12–17 is shown for sake of clarity of representation; however, it should be understood that the beam 8 undergoes multiple reflection in 22 as illustrated by beams 8', 8", etc. Electrodes 27 and 28 are connected to adjustable power supply 14 to bias the layers 21 and 23 in the blocking direction against each other creating ionic space charges 24 and 25 indicated by + and − which generate a strong electric field illustrated by field lines 26, 26', 26", etc., across 22. This field depletes 22 of its carriers of electricity and polarizes the (GaAl)As film causing a small but finite change in its refractive index. This change is sufficient to cause a significant change in the intensity of the transmitted beam.

It should be understood that instead of transmitted beam 17, the reflected beam 29 can be utilized. Intensity of 29 is modulated by the electric field, similar to that of 17, since the sum of the intensities of 17 and 29 is nearly a constant.

Coupling of light beam to the modulator structure occurs in FIG. 2 through lateral faces of layers 21 and 23.

Figure 3:
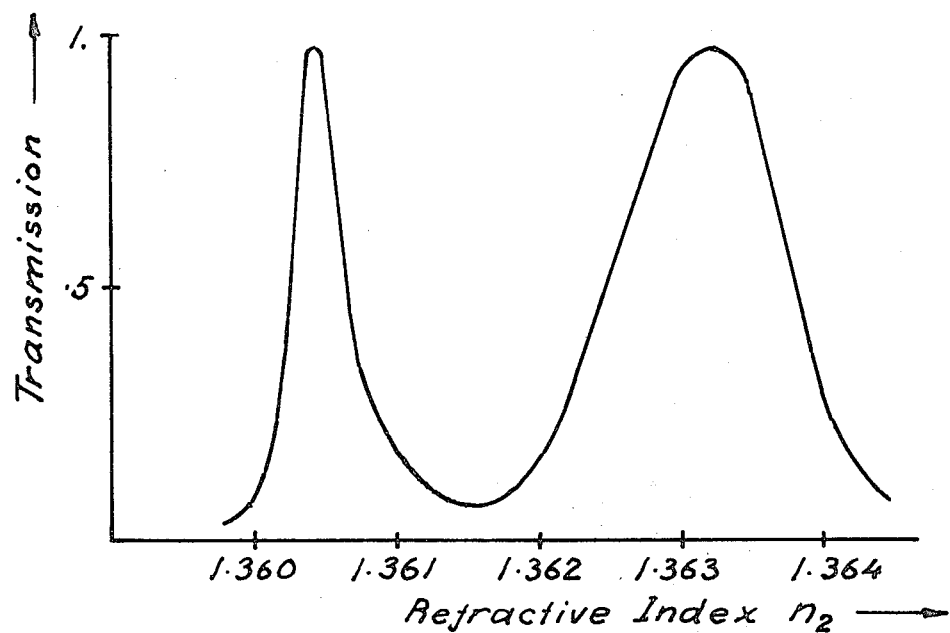
FIG. 3 shows the dependence of the intensity of emitted beam on change of refractive index of central optical resonator for structure of FIG. 2.

FIG. 3 illustrates the transmission factor, i.e., the ratio of intensities of transmitted beam 17 to incident beam 4 as a function of the refractive index $n_2$ of shaped layer 22 of width of 10 wavelengths assuming that the refractive indices of layers 21 and 23 are 1.72, and that the angle of incidence of 5 on the interface between 21 and 22 is 65°. While these data do not pertain to the materials specified in FIG. 2, they are realistic for what can be achieved by present-day technology. Note the existence of a series of transmission peaks of which the first two have been illustrated in FIG. 3. The chosen angle of incidence of 65° is only slightly smaller than that for total reflection.

Figure 4:
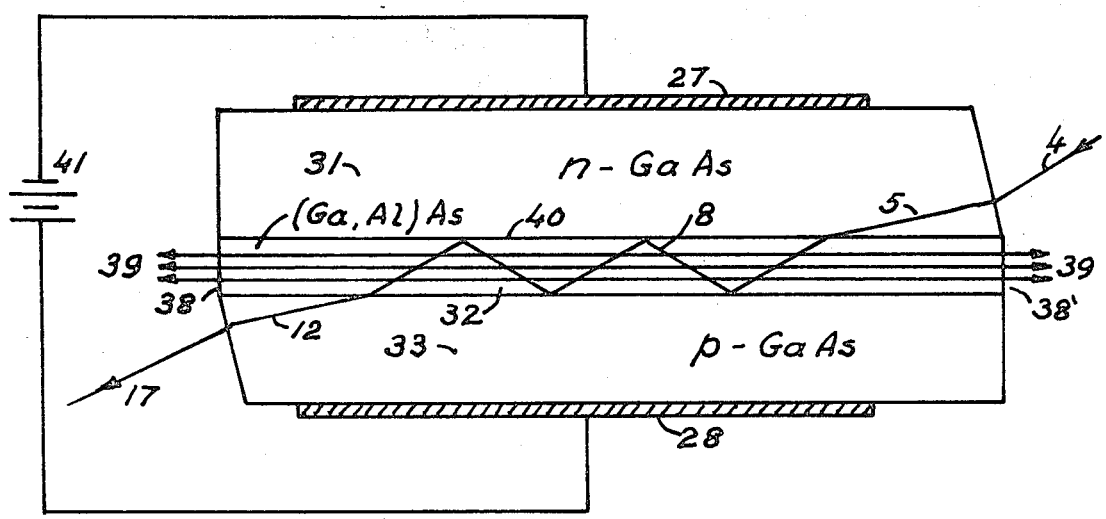
FIG. 4 shows a multiple reflection interference filter according to this invention for the modulation of transmitted radiation by a laser beam.

Referring now to FIG. 4, there is shown a modification of the structure of FIG. 2, which enables tuning the filter by a laser mode. In FIG. 4, layers 31, 32, 33 are $Ga_{0.7}Al_{0.31}As$, GaAs and $Ga_{0.7}Al_{0.3}As$, respectively. Layers 31 and 33 are doped to n- and p-conductivity types indicated in FIG. 4. The end faces 38, 38' of 32 are semitransparent reflecting parallel mirrors to sustain laser mode 39 in 32, stimulated by electric pumping of forward biased p-n junction using power supply 41 connected to electrodes 27 and 28. Laser mode 39 generates an electromagnetic field in cavity 32, which modifies the refractive index of layer 32.

Incident beam 4 is of wavelength for which GaAs and (GaAl)As are transparent, and preferably of substantially larger wavelength than that of laser mode 39. Incident beam 4 is refracted into beam 5, which is incident under a grazing angle on interface 40 between 31 and 32. Portion of 5 enters 32 as beam 8 and undergoes multiple reflections at or near resonance condition before leaving 32 as beam 12. Outgoing beam 17 arises by interference of many beams, such as 12, undergoing different degrees of multiple reflections in 32.

In a different mode of operation of the structure shown in FIG. 4, the incident beam 4 is chosen of substantially the same wavelength as laser mode 39. By operating in the sublaser regime, amplification of beam 8 when proceeding along 32 is achieved by MASER action of the active centers in 32, pumped electrically by 41 to achieve the population inversion of excited states, which is necessary for MASER action.

The structures of FIGS. 1, 2 and 4 comprise an optical resonator in which the light beam undergoes multiple reflections without being fully or totally reflected at its boundaries.

In a modification of these structures, the resonator layer can be provided with a boundary at which full or total reflection takes place. This can be achieved by providing one boundary with a thick metallic mirror, e.g., p-GaAs layer 23 of FIG. 2 can be replaced by a highly reflecting metal layer. Electrically modulated output would then consist in beam 29. However, in a preferred arrangement, high reflectivity is achieved by using the phenomenon of total reflection of beam arriving from optically denser medium ($n_2$) at the interface to an optically less dense medium ($n_1$) at an angle $\Phi$ for which $\sin \Phi > n_1/n_2$. In another preferred arrangement of our invention, the phenomenon of frustrated total reflection is used. This phenomenon occurs when total reflection occurs at a sufficiently thin layer, that a portion of the reflected beam can escape through said thin layer into an adjacent optically denser material.

Figure 5:
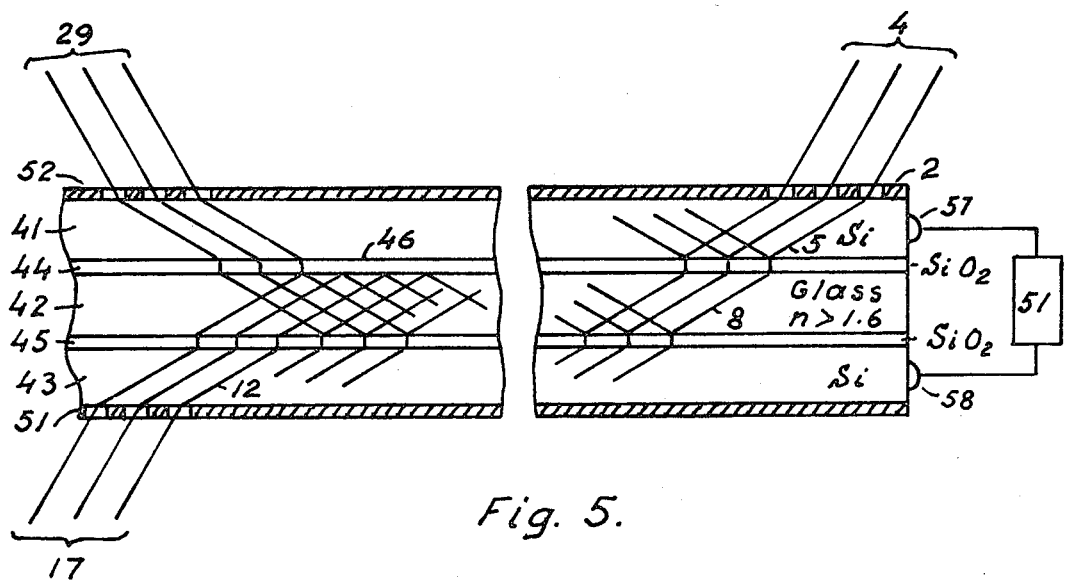
FIG. 5 shows an electrically tunable frustrated total reflection filter according to this invention.

The structure of FIG. 5 comprises an optical resonator film 42 sandwiched between thin layers 44 and 45 which separate 42 from layers 41 and 43. Layers 44 and 45 have a refractive index which is smaller than those of layers 42, 41 and 43. Incident beam 4 is diffracted by zone plate 2 into beam 5 which is totally reflected at interface 46 between layers 41 and 44. However, since layer 44 is only about one wavelength thick, some energy transfer from beam 5 into resonator layer 42 occurs by tunneling. Thereby, a beam 8 is generated in 42 undergoing multiple total reflections on the boundaries with layers 44 and 45. Portions of this beam are coupled by tunneling through layers 44 and 45 into layers 41 and 43 where they interfere to generate transmitted beam 17 and reflected beam 29. These beams are coupled to the outside by diffraction gratings 51 and 52. A frustrated total reflection filter has been described by Turner (U.S. Pat. No. 2,601,806) to provide an optical filter which depends sensitively on the angle of incidence of a light beam.

By choosing semiconducting materials, such as silicon for layers 41 and 43 and providing for electrodes 57 and 58, an electric field can be generated across the films 44, 42 and 45 from power supply 51. This electric field changes the refractive indices, and thus modifies angle of refraction of beam 8, tunnel coupling through layers 44 and 45 and phase relationships for interference, all affecting the intensities of outgoing beam 17 and reflected beam 29 which can be modified by application of electric power 51.

It should be understood that each or both of the tunneling films 44, 45 in FIG. 5 may be replaced by a multiplicity of thin films. Some of these films may be tunneling regions, which serve as highly reflecting boundaries for thin film 42.

The structure of FIG. 5 can be prepared as follows: Two silicon slices, 41 and 43, one n-type and the other p-type are provided with thermally grown oxide layers 44 and 45 on an optically flat surface. These oxide layers are typically between 0.1 and 1 micron thick. On one of the oxide layers an optical glass is deposited, e.g., by sputtering of Corning 7059 glass as described by J. E. Goell and R. D. Standley in Bell System Technical Journal, 48, No. 10, December 1969, p. 3445. This layer has a refractive index of 1.62 compared to 1.55 for $SiO_2$ and 3.5 for silicon. The two structures are then stacked and fused together by a time-temperature cycle above softening point of the glass, but below the melting point of silicon. Instead of using Corning glass 7059 as the central optical resonator layer 42, one may use amorphous selenium, phosphorous silicate glasses or lead silicate glasses. The latter can be prepared by exposing or depositing on the $SiO_2$ surface a thin layer of phosphorous pentoxide or lead oxide, in conjunction with a suitable heat treatment.

Figure 6:
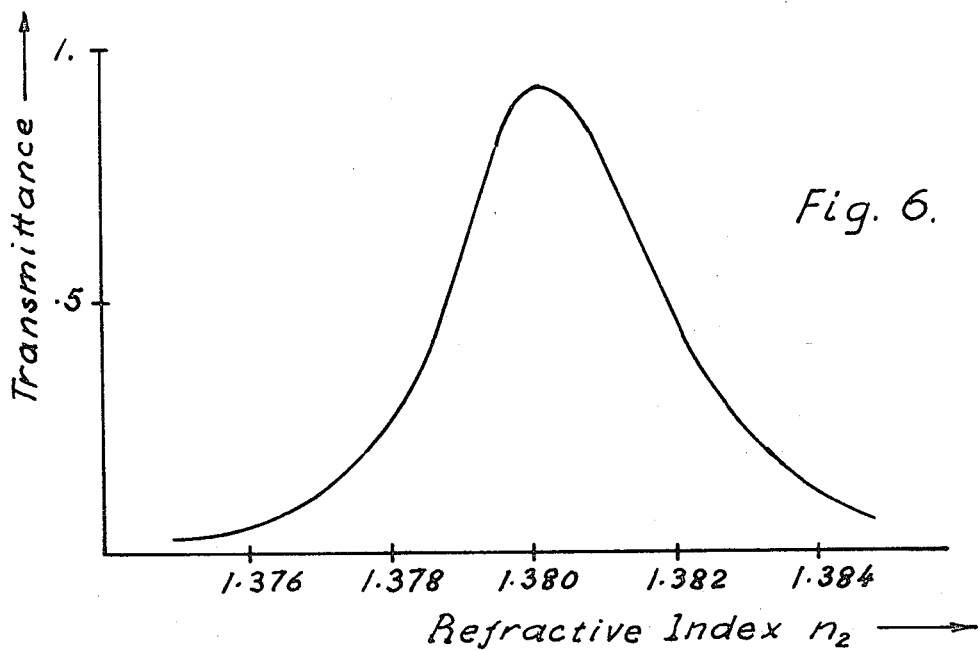
FIG. 6 shows the dependence of the transmitted beam intensity on the change of the refractive index in the tunnel layers of the filter of FIG. 5.

FIG. 6 shows a typical relationship of energy transmitted through a frustrated transmission filter vs. change in refractive index of the tunnel layers, such as 44, 45 of FIG. 5. The numerical values for the structure to which FIG. 6 applies are as follows: Layers 41 and 43 of $n = 1.72$; layers 44 and 45 (magnesium fluoride) of $n_2 = 1.38$ and 5/4 wavelengths thick; layer 42 (zinc sulfide) $n = 2.3$ and one wavelength thick.

In the structures of FIGS. 1, 2, 4 and 5 adjacent layers of different optical properties had substantially different chemical compositions.

Figure 7:
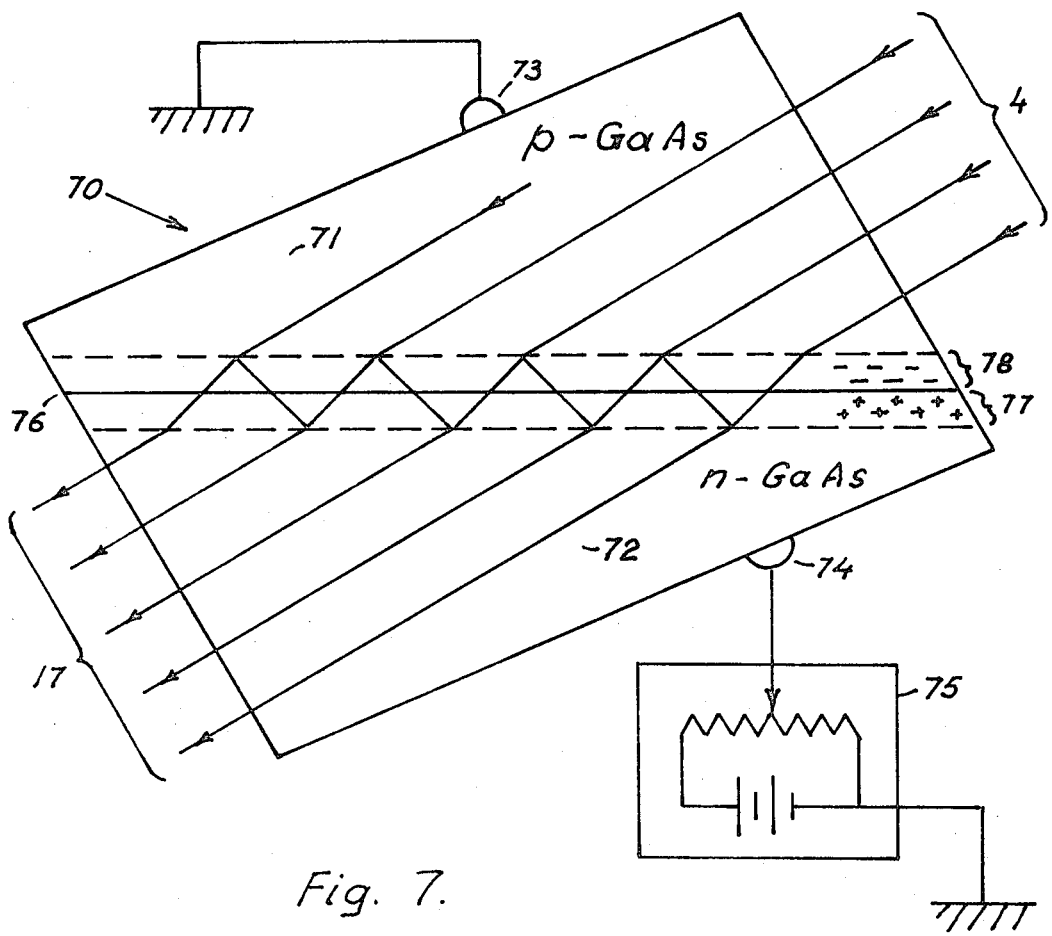
FIG. 7 shows an electrically tunable multiple reflection interference filter according to this invention using a p-n junction structure in a semiconductor.

In another preferred embodiment of this invention, the chemical composition of at least two adjacent films of different optical properties is substantially identical and the different optical properties are induced by a space charge layer. As an example of such a structure, FIG. 7 shows a block of GaAs 70, containing a p-region 71 and an n-region 72. Electrodes 73 and 74 connect these regions to variable power supply 75 comprising a battery and a potentiometer to bias p-n junction 76 in the blocking direction. Proceeding from the n-region 72 through the junction 76 into the p-region 71, one encounters in sequence: a region 77 depleted of free electrons causing an increase in refractive index; a region of substantial field strength near junction 76 causing a further change in refractive index; and a region 78 depleted of holes causing an increase in refractive index as compared to the bulk p-layer 71; and finally, the p-type bulk layer 71. Thus, a p-n junction is optically a three-layer structure whereby the width of central layer and its refractive index are electrically tunable. Thus, the p-n junction structure can be used as an electrically tuned optical filter for a beam 4 coupled into the structure under a sufficiently grazing angle to undergo multiple reflections in the central high field region near the junction 76.

Figure 8:
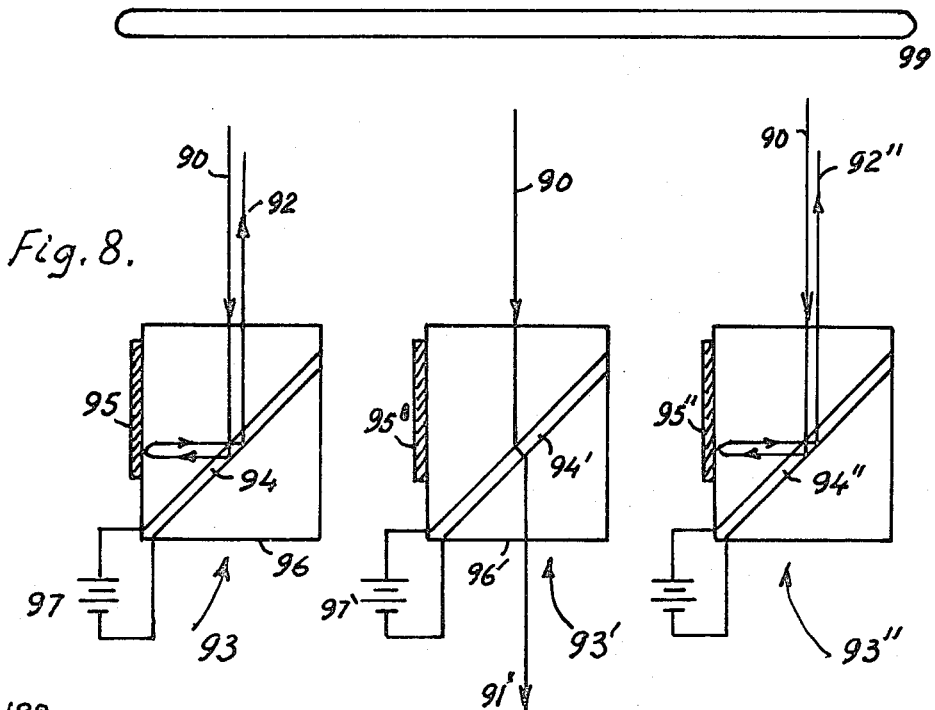
FIG. 8 shows an array of electrically tunable multiple reflection interference filters according to this invention arranged for display purposes.

We now proceed to the application of the electrically tunable filters for display purposes. A display according to this invention is shown in FIG. 8 in cross section and utilizes a light source 99 generating the parallel light beams 90, incident on an array of elements 93, 93', 93''. Each element contains an electrically tunable filter, 94, 94', 94'', of one of the types previously described in this invention. The filters are designed for 45° angle of incidence. Electric power supplies for individual electrical activation of each filter are indicated by 97, 97', 97''. In the case shown in FIG. 8, elements 94 and 94'' are assumed to be set electrically for reflection, while element 94' is set electrically for transmission. Reflected beam 92 of filter 94 is reflected on mirror 95, then again on 94 before leaving in direction of incoming beam 90.

In general, the power supplies 97, 97', 97'' will derive their power from a single battery with control means inserted between said battery and each filter to modify voltage at each filter in a prescribed manner. Simultaneous application of voltages or else sequential application by scanning mechanism may be used.

In a holographic display using an incident beam 90, electric signals are applied simultaneously to all tunable filters and there are means to bring outgoing beams from all filters to interference.

Figure 9:
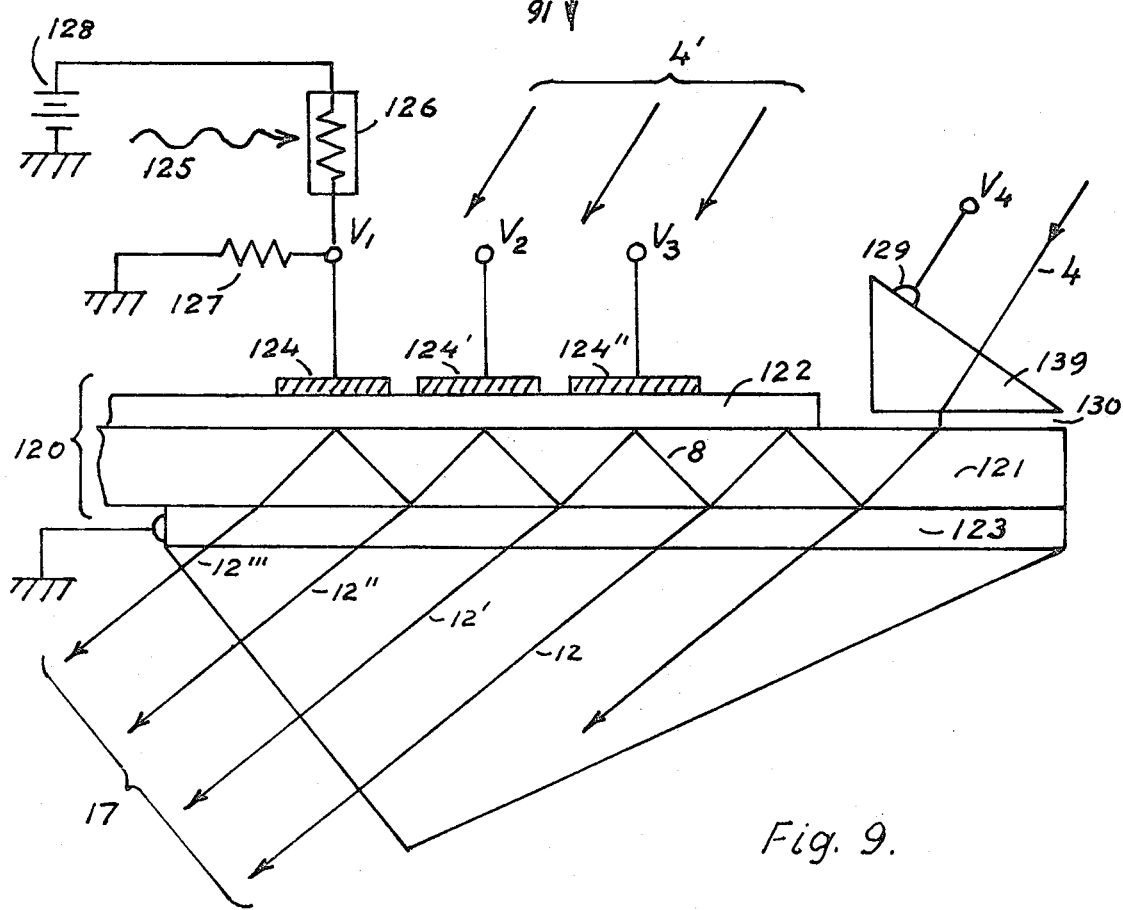
FIG. 9 shows an electrically tunable resonator filter according to this invention having a number of laterally spaced electrodes. Also shown is an optical means for adjusting the electric field in this filter and an electrically tunable coupling means for the light beam into the resonator.

As an example, FIG. 9 shows an electrically tunable filter 120 comprising a resonator film 121 sandwiched between two films 122 and 123. Incident beam 4 is coupled by prism 139 into optical resonator 121 by using appropriate angle of incidence as described by R. Ulrich in the Journal of the Optical Society of America, Vol. 60, pp. 1337–50, October 1970. In fact, the prism coupling of beam 4 into the optical resonator 121 represents one-half of a frustrated reflection filter. Dielectric layer 122 has a lower refractive index than 121, and angles of incidence of multiply reflected beam 8 in 121 onto the boundary of 122 are chosen that total reflection takes place. On the other hand, total reflection does not take place at boundary of layer 123 so that portion of beam 8 leaves through 123 as beams 12, 12', 12'', 12''', etc. Actually, there is not a single ray 4 incident, but a bundle of rays, and there are many hundreds if not thousands of multireflections so that the outgoing beams encompass rays having undergone different degrees of multiple reflections. These rays are brought to interference in the outgoing beam 17.

The layer 123 is a transparent semiconductor and represents one electrode to the electrically tunable filter 123. A set of other electrodes are represented by 124, 124', 124''. These are metallized areas located on the upper surface of 122. By imposing voltages $V_1$, $V_2$, $V_3$ on these electrodes against grounded 123, the resonance conditions in the sections of 121 underlying 124, 124' and 124'' are modified by the resulting electric fields, which imprints on the beam 8 phase modulations. These phase modulations are combined in outgoing beam 17, thereby obtaining a holographic representation of the voltages $V_1$, $V_2$, $V_3$.

FIG. 9 illustrates a means to create a phase modulation of outgoing beam 17 by an incident control beam 125. This means comprises a photoresistor 126 in series with ordinary resistor 127 and battery 128. Beam 125 modifies the resistance of 126, and thus controls the voltage $V_1$ applied to electrode 124. In this manner, the electric field in the resonator 121 underlying 124 can be controlled by the intensity of control beam 125.

The coupling prism 139 is made from a transparent semiconducting material having a contact 129 to which a potential $V_4$ is applied. This potential modifies the electric field between 139 and 123 and, therefore, the coupling of beam 4 into resonator 121. In fact, the prism 139, the gap 130, and the layers 121 and 123 represent an electrically tunable frustrated reflection filter of type similar to that of FIG. 5, except that no frustrated reflection film is inserted between 121 and 123, which is immaterial for the desired operation.

Instead of incident beam 4 coupled through prism 139, a broad beam 4' can be used incident through transparent electrodes 124, 124', 124" along the entire resonator.

Figure 10:
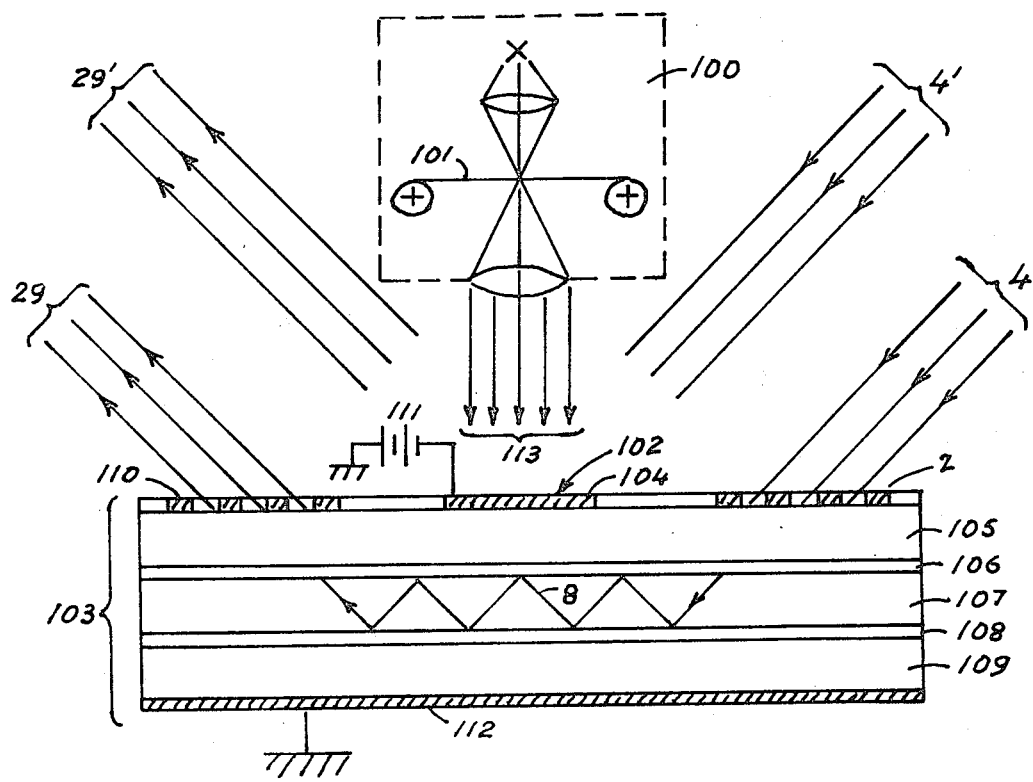
FIG. 10 shows an electro-optically modulated multiple reflection interference filter according to this invention for generation of a holographic representation of a slide or movie projection.

Referring now to FIG. 10, there is shown a movie projector 100 which projects a movie from film 101 on surface 102 of the electrically tunable filter 103. Filter 103 comprises the transparent metal electrode 104, layers 105, 106, 107, 108 and 109. These layers represent a frustrated total reflection filter for laterally incident beams 4 or 4', which are either coupled by means of diffractive grating 2 into the filter 103 under the appropriate angle as described previously to generate beam 8 in layer 107, or else are incident through transparent electrode 104. Beam 8 undergoes multiple total reflection on 106 and 108. Portions of 8 are emitted as beam 29 through grating 110 or else as 29' through 104. Electrical tuning of intensity of 29 is provided from power supply 111 applied to 104 and electrode 112 adjacent to 109. Optical tuning of intensity of beam 29 by incident light 113 is achieved as follows. All films 105, 106, 107 and 108 are chosen of finite electrical conductance so that the field in each film depends on its conductance. By choosing at least one film from material which is photoconductive for light 113, the field distributions in all films can be modified in response to the intensity of light 113. This intensity will vary laterally in accordance with the image projected from film 101. The locally varying intensities cause corresponding local variations in the optical properties of filter 103 for beam 4 which are brought to interference with each other by multiple reflections of beam 8, thereby generating a holographic representation of movie from film 101 in outgoing beam 29.

There is a very large number of materials which can be used for the purposes of this invention. In principle, any non-metallic material can be used as optical or dielectric layer for the electrically tunable filters of this invention, provided that its fundamental absorption edge lies at a shorter wavelength than the light beam whose intensity is to be modulated by the filter.

While Pockels effect is present only in materials of lower crystal symmetry, the Kerr effect is generally present so that any such material might be used in principle for purposes of our invention. Kerr and Pockels coefficients for many materials are listed in I. P. Kaminow and E. H. Turner in an article on Electro-Optic Light Modulators, published in the Proc. of IEEE, Vol. 54, No. 10, October 1966, pp. 1374–1390.

Materials we have found particularly suitable include: the semiconductors Ge, Si; 3–5 compounds, such as GaAs, GaP and InSb; 2–6 compounds, such as ZnO, ZnS, ZnSe, ZnTe and the corresponding compounds of Cd; glassy materials, such as amorphous Se, and mixtures of As, Te, Ge and Si; oxide films, such as silicon oxide and antimony oxide formed on semiconducting materials such as silicon and InSb.

Many of the aforementioned materials are photoconductive. However, preferred photoconducting materials for the holographic application shown in FIG. 10 are amorphous selenium, ZnO and CdS.

Refractive indices and useful transmission regions for many optical materials are found in textbooks, such as *Internal Reflection Spectroscopy* by N. J. Harrick, Interscience Publishers, N. Y. (1967), pp. 140–1.

Since there are many widely differing embodiments of this invention, it should be understood that said invention is not limited by the preferred embodiments described, but that its scope comprises all structures and processes defined by the following claims:

We claim:

1. A structure for electrically modulating the intensity of a monochromatic beam of radiation, said structure comprising
   i. an optical resonator for said radiation consisting of a transparent layer between two parallel boundaries:
   ii. at least one of said boundaries comprising a thin first solid layer sandwiched between a second solid layer and said resonator, said first solid layer having a lower refractive index than said second layer and than said resonator, said first and second layers transparent to said radiation;
   iii. said beam incident through said second layer on said first layer at an angle sufficiently close to the grazing angle that said incident beam will undergo total reflection from said first layer; said first layer sufficiently thin that a portion of said incident beam tunnels through said first layer into said resonator; said portion propagating along said resonator and undergoing multiple reflections at said boundaries; part of said propagating portion extracted across one of two said boundaries, said part contributing to an out-going beam by interference;
   iv. means to generate an electric field substantially perpendicular to said first layer, said electric field varying the refractive index of at least one of said resonator, said first layer and said second layer thereby affecting the intensity of said outgoing beam.

2. The structure of claim 1, whereby said second solid layer is silicon, said first solid layer is a thin film on said silicon selected from the group of materials consisting of $SiO_2$ and $Si_3N_4$, said means of applying said electric field comprising said layer of silicon as one electrode, and a second electrode spaced from said layer of silicon by at least said thin film selected from said group of materials.

3. The structure of claim 1, whereby said means to generate an electric field comprises two electrodes applied at said structure.

4. The structure of claim 3, whereby a potential applied at said electrodes generates an electric field of orientation substantially perpendicular to said two boundaries.

5. The structure of claim 4, whereby at least one of said two electrodes is a thin transparent metal film substantially parallel to one of said two boundaries.

6. The structure of claim 4, whereby one of said two electrodes is a semiconducting layer.

7. The structure of claim 6, whereby said semiconducting layer is adjacent to one of said boundaries.

8. The structure of claim 4, whereby both electrodes are semiconducting layers.

9. The structure of claim 8, whereby one of said semiconducting layers is adjacent to one of said boundaries, and the other semiconducting layer is adjacent to the other said boundary.

10. A structure for electrically modulating the intensity of a monochromatic beam of radiation, said structure comprising
  i. an optical resonator for said radiation consisting of a transparent layer between two parallel boundaries;
  ii. one of said two boundaries comprising a thin second layer and the other of said two boundaries comprising a thin third layer, said second layer sandwiched between said resonator and a fourth layer; said third layer sandwiched between said resonator and a fifth layer, said second layer having a lower refractive index than said resonator and said fourth layer, layer; and said third layer having a lower refractive index than said resonator and said fifth layer; said second, third, fourth and fifth layers transparent to said radiation;
  iii. said beam incident through said fourth layer on said second layer at an angle larger than the critical angle of total reflection so that total reflection occurs at said second layer, said second layer sufficiently thin so that portions of said beam from said fourth layer penetrate through said second layer into said resonator, where said portions propagate undergoing multiple total reflections on said second and third layers, part of said radiation in said resonator penetrating through at least one of said second and fourth layers contributing to an outgoing beam by interference;
  iv. means to generate an electric field substantially perpendicular to said second and third layers, said electric field varying the refractive index of at least one of said resonator, second, third, fourth and fifth layers thereby affecting the intensity of said outgoing beam.

11. The structure of claim 10 comprising a silicon slab as one of said fourth or fifth layers, said silicon slab serving as an electrode, and a thin film of $SiO_2$ or $Si_3N_4$ as one of said second or third layers.

* * * * *